(12) United States Patent
Lai et al.

(10) Patent No.: US 7,168,029 B2
(45) Date of Patent: Jan. 23, 2007

(54) METHOD FOR TESTING A UNIVERSAL SERIAL BUS HOST CONTROLLER

(75) Inventors: Ching-Chung Lai, Taipei (TW); Hung-Pin Chen, Taipei (TW)

(73) Assignee: Via Technologies Inc., Taipei (TW)

( * ) Notice: Subject to any disclaimer, the term of this patent is extended or adjusted under 35 U.S.C. 154(b) by 465 days.

(21) Appl. No.: 10/368,780

(22) Filed: Feb. 19, 2003

(65) Prior Publication Data

US 2003/0159102 A1 Aug. 21, 2003

(30) Foreign Application Priority Data

Feb. 21, 2002 (TW) ............................. 91103068 A

(51) Int. Cl.
*H03M 13/00* (2006.01)
(52) U.S. Cl. .................................... 714/781
(58) Field of Classification Search .................... 714/1, 714/712, 715–717, 39, 40, 56, 734, 735; 709/220, 223, 224, 228; 417/39
See application file for complete search history.

(56) References Cited

U.S. PATENT DOCUMENTS

| | | | | |
|---|---|---|---|---|
| 4,835,459 A | * | 5/1989 | Hamlin et al. | 324/73.1 |
| 4,941,115 A | * | 7/1990 | Nihart et al. | 702/117 |
| 5,257,393 A | * | 10/1993 | Miller | 709/224 |
| 6,157,975 A | * | 12/2000 | Brief et al. | 710/104 |
| 6,367,028 B1 | * | 4/2002 | Schmalzried | 714/1 |
| 6,393,588 B1 | * | 5/2002 | Hsu et al. | 714/43 |
| 6,480,801 B2 | * | 11/2002 | Chew | 702/122 |
| 6,654,699 B2 | * | 11/2003 | Millard | 702/108 |
| 6,665,626 B2 | * | 12/2003 | Hsieh et al. | 702/108 |
| 6,718,412 B2 | * | 4/2004 | Purcell et al. | 710/109 |
| 6,732,301 B1 | * | 5/2004 | Landry et al. | 714/43 |
| 6,804,709 B2 | * | 10/2004 | Manjure et al. | 709/220 |
| 6,829,726 B1 | * | 12/2004 | Korhonen | 714/25 |
| 6,865,222 B1 | * | 3/2005 | Payne | 375/224 |
| 2001/0018646 A1 | * | 8/2001 | Nagashima et al. | 703/13 |
| 2003/0056036 A1 | * | 3/2003 | Carlton | 710/15 |
| 2003/0097495 A1 | * | 5/2003 | Hansen | 710/8 |

\* cited by examiner

*Primary Examiner*—Guy Lamarre
*Assistant Examiner*—Sam Rizk
(74) *Attorney, Agent, or Firm*—Thomas, Kayden, Horstemeyer & Risley

(57) ABSTRACT

A chip test method is suitable for testing a universal serial bus host controller. First, the host controller and the client device are individually set in a test mode. Next, the client device performs a client-side test preparation action. In addition, the host controller performs a host-side test preparation action. The host controller sequentially outputs a number of requests to the client device. The client device, in response to the requests, outputs simulated responses individually to the host controller, wherein the simulated responses are selected from correct responses corresponding to the requests, possible faulty responses, and error responses that are possibly to be received by the host controller during actual operation. Finally, the host controller performs a verification test to verify whether the host controller works properly under the various simulated situations.

10 Claims, 1 Drawing Sheet

METHOD FOR TESTING A UNIVERSAL SERIAL BUS HOST CONTROLLER

This application claims the benefit of Taiwan application Ser. No. 091103068, filed on Feb. 21, 2002.

BACKGROUND OF THE INVENTION

1. Field of the Invention

This invention relates to a chip test method, and more particularly to a method for testing a universal serial bus host controller.

2. Description of the Related Art

The universal serial bus (USB) is an interface suitable for use in various kinds of peripheral devices. It can allow various kinds of computer peripheral devices to be connected with the host computer in a unified and standard manner. By using the universal serial bus, when the computer system is under operation, the computer system can communicate with its peripheral devices. Additionally, each of the peripheral devices can be selectively connected, installed, used, or removed when the computer system is operating to achieve the function of plug and play (PnP).

FIG. 1 schematically illustrates the coupling relationship between a USB host controller and a client device. The universal serial bus 106 needs a host controller 102 to control the communication with the peripheral devices attached to the bus. When the host controller 102 outputs a request rq via the universal serial bus 106 to the client device 104, the client device 104 sends a response rs to the host controller 102 according to the request rq. The request rq and the response rs are transmitted in the universal serial bus in the form of packet and the request rq must include the address and endpoint fields.

In general, the chip is to be tested after fabrication so as to verify its functions. The conventional method for testing the USB host controller is to output requests in sequence from the USB host controller to the client device, and the client device then sends the responses in the same sequence. The function of the host controller is then verified by checking whether or not the responses received by the host controller are correct.

The disadvantage of the conventional method for testing the host controller is that it can only test whether or not the action of the host controller is accurate during normal operations. During actual operations, there are many factors, such as the faulty action by the client devices or data packet loss due to bus congestion and so on, which will in some cases result in a host controller receiving a response that is irrelevant to the request. When the host controller encounters this kind of situation, the responses with error or fault may affect the behavior of the host controller and its subsequent actions, resulting in problems in operation. However, the conventional chip test method is neither capable of detecting such situation nor verifying that the host controller is still operating properly.

In addition, as the performance of the computer and its peripheral devices improves, the transmission rates provided by the conventional USB 1.0 and USB 1.1 cannot fulfil the requirements for high speed peripherals and applications. The latest USB standard, USB 2.0, can provide a faster transmission rate enabling high speed connections between a USB 2.0 compliant computer and its peripheral devices. However, the packet format of USB 2.0 is different from that of USB 1.x making the conventional chip test method unsuitable for host controllers compliant to USB 2.0.

SUMMARY OF THE INVENTION

It is therefore an objective of the invention to provide a chip test method, used for more precisely emulating actual operating conditions, so as to test a universal serial bus (USB) host controller.

In accordance with the foregoing and other objectives of the invention, the invention provides a chip test method, suitable for use in testing the USB host controller, wherein a client device is coupled to the host controller so as to test the USB host controller via the USB. The chip test method includes the following steps. First, the host controller and the client device are individually set in a test mode. Then, the client device performs a client-side test preparation action. Additionally, the host controller performs a host-side test preparation action. After that, the chip test for the host controller is performed. The host controller sequentially outputs a number of requests to the client device. On receiving the requests, the client device outputs simulated responses to the host controller, wherein the simulated responses are selected from correct responses corresponding to the requests, possible faulty responses, and error responses, which are possibly to be received by the host controller during actual operations. Finally, the host controller performs a verification test to verify whether the host controller works properly under the various simulated situations.

Other objects, features, and advantages of the invention will become apparent from the following detailed description of the preferred but non-limiting embodiments. The following description is made with reference to the accompanying drawings.

DETAILED DESCRIPTION OF THE INVENTION

According to the invention, various situations that can occur during actual operations of a host controller are taken into consideration in order to verify its functionality more precisely and completely. The chip test method first enables the host controller to output requests to a client device for testing, and simulated responses selected from correct responses corresponding to the requests, possible faulty responses, and error responses, which are possibly to be received by the host controller during actual operations, are then produced by the client device to test the host controller. These simulated responses can be, for example, the faulty or error actions caused by the client devices, or data packet loss due to bus congestion.

Figure 1:
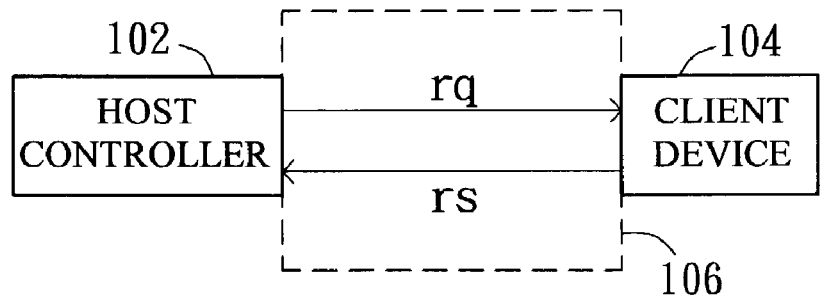
FIG. 1 illustrates the coupling relationship between a universal serial bus host controller and a client device.
Figure 2:
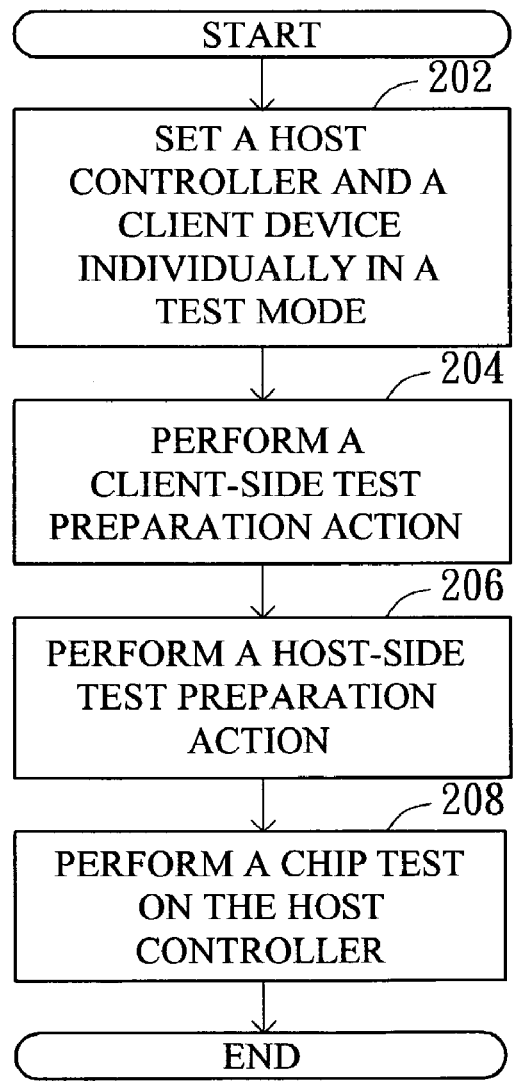
FIG. 2 is a flowchart illustrating a chip test method according to the preferred embodiment of the invention.

The chip test method is shown in FIG. 2 in flowchart form according a preferred embodiment of the invention. First, the method begins and enters step 202 to set the host controller and the client device individually in a test mode. The client device, used in the chip test, is implemented on another host controller dedicated for chip testing. Certainly, the client device can be a real-life client device, such as a computer peripheral device. In addition, such test device is used to simulate possible actual actions of the actual client device, so as to output the simulated response corresponding to the request received by the test device.

After that, step 204 is performed, in which the client device performs a client-side test preparation action. The client device can be coupled to a memory device, for example, the memory in a computer host. The memory device stores test data including a number of requests and a number of simulated responses corresponding to the requests, which are used in the chip test. When the client device performs a client-side test preparation action, the test data will be retrieved from the memory device and temporarily stored into a data buffer of the client device, which can be a synchronous dynamic random access memory (SDRAM).

In the invention, the simulated response is given notably under conditions that are not limited to the ideal situation, compared to the normal response with respect to each of the requests. In addition, the actual operation is taken consideration in the design of the simulated responses with respect to the requests individually, so as to simulate the actual operations in the chip test. For example, in response to a particular request, a simulated response that is a faulty or an error response is to be sent to the host controller. In this manner, all kinds of possible situations occurred during actual operations are simulated for the host controller in the chip test. Whether or not the host controller will operate properly is verified when various faulty or error responses are received with respect to a request from the host controller.

Step 206 is then performed, in which the host controller performs a host-side test preparation action. The host controller is also coupled to the memory device. When performing the test preparation action for the host controller, the host controller obtains the test data from the memory device and temporarily store it in a data buffer of the host controller, which can be a SDRAM device.

After that, step 208 is executed, in which a chip test is performed on the host controller. First, the host controller, according to the test data temporarily stored in the data buffer, sequentially outputs a number of requests to the client device via the universal serial bus. Next, the client device, in response to the received request, sequentially outputs the simulated response according to the test data temporarily stored in the data buffer. The simulated responses are delivered to the host controller via the universal serial bus. It should be noted that the simulated responses are selected from correct responses corresponding to the requests, possible faulty responses, and error responses, which constitute all of the possible responses to be received by the host controller during actual operations. Finally, the host controller performs a verification test to verify whether the received responses of the host controller are identical to the corresponding responses of the requests send from the host controller by comparing the received responses individually with the corresponding responses stored in the data buffer. If so, it indicates that the chip, i.e. the host controller, has passed the test. If a difference has occurred, it indicates that the chip has a defect and further inspection is necessary to perform. In addition, a number of status registers inside the host controller are also checked. If an error is found, a further inspection of the chip is necessary. In this manner, the various situations can be more precisely simulated for a USB host controller, so as to test the chip more thoroughly. In addition, according to the invention, the chip test method can be used in testing a host controller compliant with USB standard such as USB 1.x or USB 2.0 by designing corresponding test data, as described above.

The chip test method has been disclosed in the above embodiment of the invention. When considering actual operations, all possible occurrences, including normal and abnormal situations, have been considered so as to more precisely simulate all the possible situations that may be encountered during actual operations. The chip test can verify whether the host controller will operate properly after it receives a faulty or an error response to a request sent by the host controller.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for testing a host controller, said method comprising the steps of:

coupling said host controller at a host side to a client device at a client side via a peripheral bus in order to test said host controller, wherein, at said host side, said host controller is coupled to a memory device for storing test data including a plurality of requests of said host controller, and, at said client side, said client device is coupled to a memory device for storing test data of said client device;

setting said host controller and said client device individually in a test mode;

performing a client-side test preparation action at said client device in the test mode to buffer said test data at the client side;

performing a host-side test preparation action at said host controller in the test mode to buffer said requests at the host side;

sequentially outputting said requests from said host controller to said client device;

in response to said requests, producing a plurality of simulated responses according to the buffered test data from said client device to said host controller, wherein said simulated responses include correct responses corresponding to said requests, faulty responses, and error responses, wherein said simulated responses are to be received by said host controller during actual operation, the correct responses simulate normal situations, and the faulty and error responses produced to said host controller are irrelevant to the requests received by said client device in order to simulate abnormal situations that cannot be simulated by the correct responses; and performing a verification test at said host controller to verify whether said host controller works properly, said verification test comprising:

checking whether said response received by said host controller is correct according to said test data of said host controller; and when the faulty and error responses are received from the client device, checking whether status data stored in a plurality of status registers of said host controller is correct.

2. The method as recited in claim 1, wherein said client device is installed on another host controller.

3. The method as recited in claim 1, wherein said client device comprises a data buffer, and said client-side test preparation action comprises the step of:

reading said corresponding simulated responses from said memory device, and temporarily storing said requests and said corresponding simulated responses into said data buffer.

4. The method as recited in claim 3, wherein said data buffer is a synchronous dynamic random access memory (SDRAM).

5. The method as recited in claim 1, wherein said host controller further comprises a data buffer, and said host-side test preparation action further comprises the step of:

reading said requests from said memory device, and temporarily storing said requests and said corresponding simulated responses into said data buffer.

6. The method as recited in claim 5, wherein said data buffer is a synchronous dynamic random access memory (SDRAM).

7. The method as recited in claim 1, wherein said bus is a universal serial bus (USB).

8. The method as recited in claim 7, wherein said universal serial bus is compliant with USB 2.0.

9. The method as recited in claim 1, wherein the faulty and error responses including responses simulating the abnormal situations that are caused by data packet loss due to congestion of the bus.

10. The method as recited in claim 1, wherein the faulty and error responses including responses simulating the abnormal situations that are caused by said client device.

* * * * *